(12) United States Patent
Bechtel

(10) Patent No.: US 8,713,102 B2
(45) Date of Patent: Apr. 29, 2014

(54) SOCIAL COMMUNITY GENERATED ANSWER SYSTEM WITH COLLABORATION CONSTRAINTS

(75) Inventor: Michael Edward Bechtel, Naperville, IL (US)

(73) Assignee: Accenture Global Services Limited, Dublin (IE)

( * ) Notice: Subject to any disclaimer, the term of this patent is extended or adjusted under 35 U.S.C. 154(b) by 1317 days.

(21) Appl. No.: 12/505,976

(22) Filed: Jul. 20, 2009

(65) Prior Publication Data
US 2011/0016179 A1   Jan. 20, 2011

(51) Int. Cl.
G06F 15/16        (2006.01)
(52) U.S. Cl.
USPC .......................................... 709/204; 709/202
(58) Field of Classification Search
USPC .................... 709/204, 202, 205, 206, 207
See application file for complete search history.

(56) References Cited

U.S. PATENT DOCUMENTS

| | | | |
|---|---|---|---|
| 7,146,381 B1 * | 12/2006 | Allen et al. ............................ 1/1 |
| 2004/0002350 A1 * | 1/2004 | Gopinath et al. ............. 455/466 |
| 2006/0101133 A1 | 5/2006 | Sbrzesny et al. |
| 2007/0038594 A1 * | 2/2007 | Goodwin et al. ................. 707/2 |
| 2007/0203996 A1 | 8/2007 | Davitz et al. |
| 2007/0209069 A1 | 9/2007 | Saklikar et al. |
| 2008/0133671 A1 * | 6/2008 | Kalaboukis ................... 709/206 |
| 2008/0307320 A1 | 12/2008 | Payne et al. |
| 2009/0244000 A1 * | 10/2009 | Thompson et al. ........... 345/156 |
| 2010/0030734 A1 * | 2/2010 | Chunilal ............................ 707/3 |
| 2010/0077317 A1 * | 3/2010 | Kritt et al. ...................... 715/752 |

OTHER PUBLICATIONS

Extended European Search Report issued for European Patent Application No. 10007342.8, dated Sep. 28, 2010. 5 pages.

* cited by examiner

*Primary Examiner* — Oscar Louie
*Assistant Examiner* — Lin Liu
(74) *Attorney, Agent, or Firm* — Brinks Gilson & Lione

(57) ABSTRACT

A method for social network collaboration addresses the need for efficient and effective way of obtaining information. The method obtains aggregated information from members of a social network collaborating in response to a source collaboration message. The method provides for a demand-driven collaborated information production such that the information is significantly more relevant and accurate.

26 Claims, 8 Drawing Sheets

SOCIAL COMMUNITY GENERATED ANSWER SYSTEM WITH COLLABORATION CONSTRAINTS

BACKGROUND OF THE INVENTION

1. Technical Field

This disclosure relates to collaboration methods and systems that communicate across computer networks to obtain collaboration input from social networks.

2. Related Art

Obtaining useful information in a collaborative manner has only increased in difficulty despite tremendous increases in connectivity and the proliferation of portable communication devices. In today's competitive society, having in possession useful information at the right time and place is essential and is one of the keys to success in a competitive business environment. Furthermore, there is a significant need for obtaining useful information in purely social contexts as well, such as the need for friends to collaborate to determine when and where to meet.

Today, computer servers on the Internet implement powerful search engines that greatly improve upon prior manual information gathering processes. Anyone seeking information can enter a search query on a user interface provided on a device connected to the Internet. The search engines search for matches to the query and return the most relevant matches to the user interface. While Internet search engines greatly facilitate locating useful information, the searches were still limited to finding individual closest matches from a pre-existing pool of information.

Therefore, a need exists to address the problems noted above and others previously experienced.

SUMMARY

Methods and systems for social network collaboration provide a more efficient and effective way of obtaining useful information. The methods and systems obtain a source collaboration message from a message source, and obtain inputs from members of a social network in response to the source collaboration message. Collaboration constraints are applied to the inputs, and the methods and systems aggregate the inputs to produce a single focused response. As a result, the methods and systems help obtain more relevant and accurate input on any particular subject raised by the message source by providing demand-driven, collaborative information production.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

Figure 1:
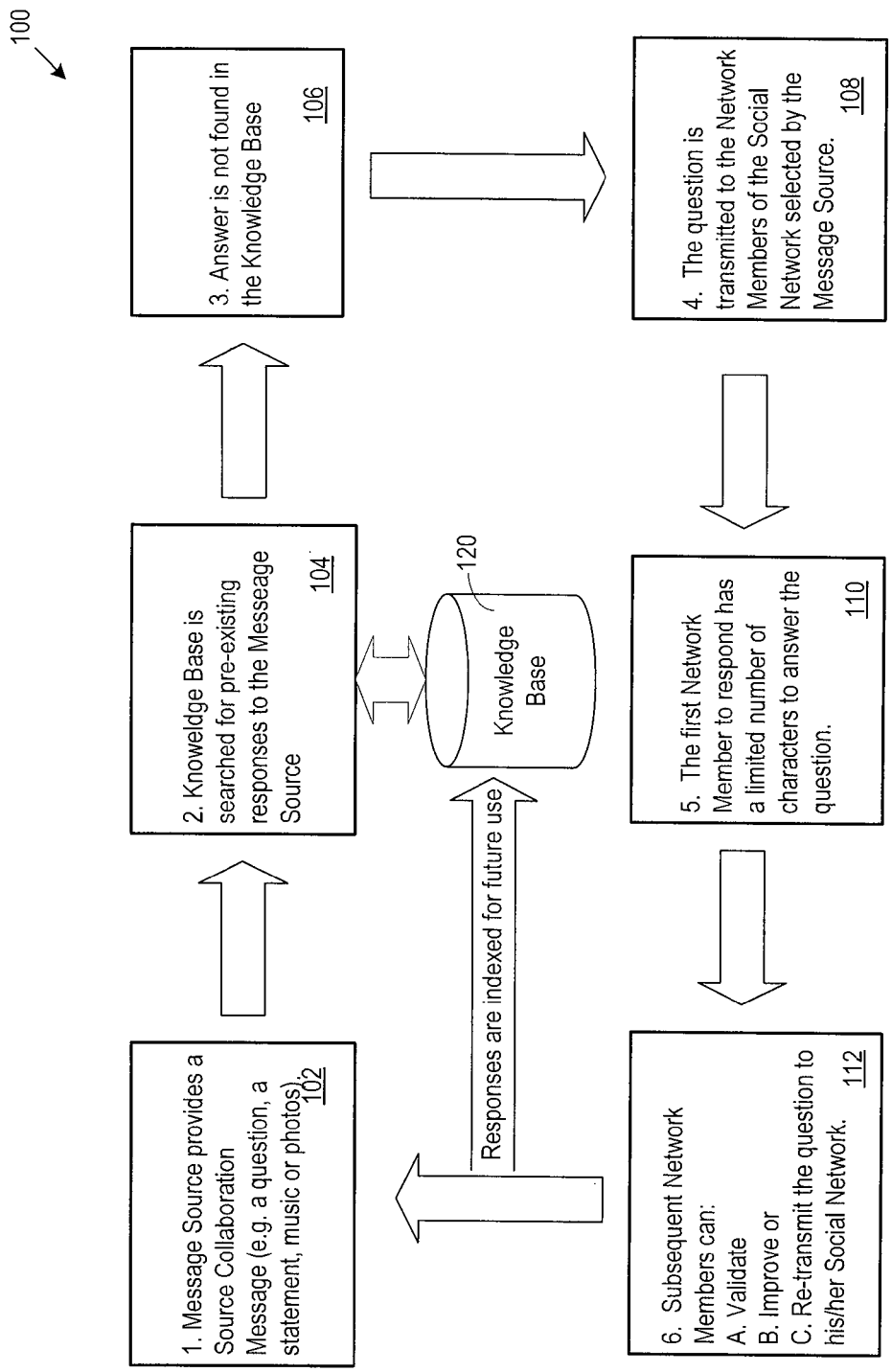
FIG. 1 shows an overall flow in which a collaboration system obtains inputs from members of social networks.

FIG. 1 shows an example of an overall information flow 100 in which a collaboration system obtains collaborative input from members of one or more social networks. A message source provides a source collaboration message to which a response is sought (102). The message source may be a person who has entered and submitted the collaboration message to the collaboration system, may be an entity such as a computer system, or may be another source of input. The source collaboration message may be, for example, in the form of a question, a statement, music, a photograph, or any other form on which input is sought.

Once the collaboration system receives the source collaboration message, the collaboration system searches through a Knowledge Base 120 to determine whether pre-existing responses to the source collaboration message (104) exist in the Knowledge Base 120. The Knowledge Base 120 may be implemented as a computer database or other data repository, and may store any information, including responses to other prior source collaboration messages. If the collaboration system finds a relevant response in the Knowledge Base 120, the collaboration system returns the response to the message source. The degree of relevancy of the response required for the collaboration system to return the response to the message source may be varied by the message source, the collaboration system, or by another entity. Despite how relevant the collaboration system considers the relevant response to be, the collaboration system may query for input from members of one or more social networks with respect to the source collaboration message.

Accordingly, whether or not the collaboration system finds a relevant response in the Knowledge Base 120 (106), the collaboration system may transmit the source collaboration message to the network members of a social network selected by the message source (108). The social network may be, for example, a group of friends, members of a contact list, members of a company department, or members of an on-line social community, such as the Facebook™ community, Twitter™ community, or other social community.

When the network members receive the source collaboration message, they may choose to provide input to the source collaboration message. As will be described in more detail below, the collaboration system imposes collaboration constraints on input from network members. For example, when the first network member responds with input on the source collaboration message, the collaboration system may limit the network member's input according to a collaboration constraint (110). The collaboration constraint may be, for example, a maximum number of characters that the network member may provide for their response to the source collaboration message. In one implementation, the maximum number of characters is 250, but other implementations may set the maximum number of characters at another number, or apply different collaboration constraints additionally or alternatively. The collaboration system aggregates the input provided by the first network member into an aggregated collaboration response. Initially, the aggregated collaboration response may be blank or empty, and the first iteration of the aggregated collaboration response may include only the input from the first network member. In other implementations, the aggregated collaboration response may initially be pre-populated with any desired initial information, rather than begin as blank.

Once the first network member to respond has completed their input, subsequent network members may begin providing further input on the source collaboration message (112). The collaboration system may also limit subsequent network members' inputs by one or more collaboration constraints. Subsequent network members may either validate the input provided by one or more prior network members, or improve the current version of the aggregated collaboration response by adding, deleting, or modifying all or part of the aggregated collaboration response. The collaboration system aggregates the inputs by each subsequent network member into the aggregated collaboration response. Accordingly, the aggregated collaboration response captures the net effect of the sequence of inputs by each network member.

The collaboration system may allow or disallow (e.g., based on a setting or preference entered by the message source) a network member to choose to re-transmit the source collaboration message, or the current aggregated collaboration response, to another social network. In other words, the collaboration system may allow any given network member to forward the source collaboration message or response to an additional social network. As a result, the members of multiple social networks may provide further input on the source collaboration message or the currently pending input on the source collaboration message. The system may also implement a privilege feature which allows a network member to forward the source collaboration message only to an authorized social network.

Once the network members have provided input on the source collaboration message, the aggregated collaboration response is returned to the message source. However, beforehand, the collaboration system may enforce one or more completion constraints on the source collaboration message. For example, a completion constraint may specify that a maximum or minimum number of network member inputs are required before returning the aggregated collaboration message, that at least a minimum time or no more than a maximum time (or both) is allowed for obtaining inputs from network members, or other collaboration constraint. The collaboration system may also index the aggregated collaboration response in the Knowledge Base 120 for future reference.

Figure 2:
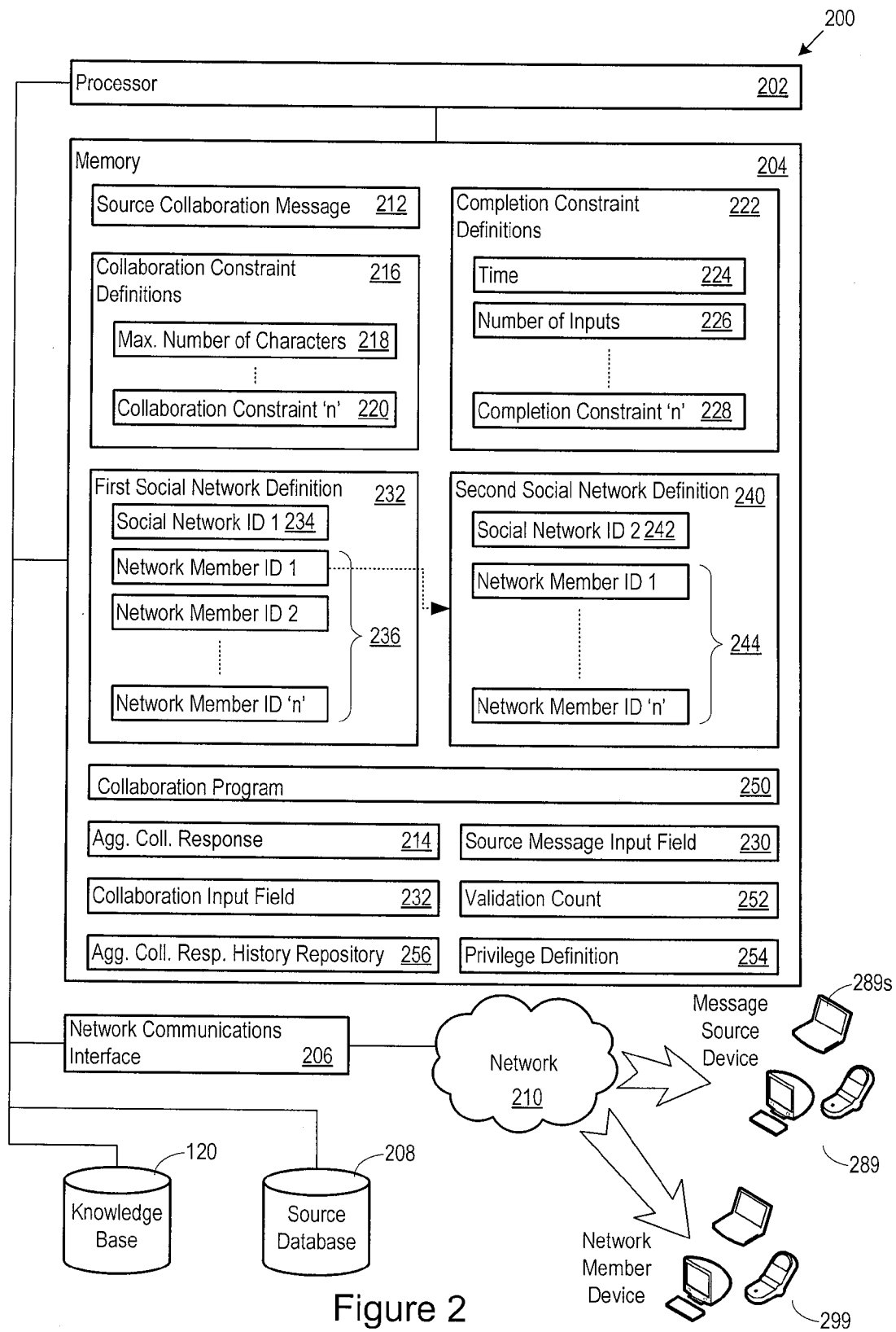
FIG. 2 shows a collaboration system.

FIG. 2 shows one example of a collaboration system 200 ("system 200") for social network collaboration. In the system 200, a processor 202 is coupled to a memory 204, a network communications interface 206, and the knowledge base 120. The processor 202 may also be coupled to a source database 208. The network communications interface 206 is coupled to the network(s) 210 so that the network communications interface facilitates communication between the system 200 and the message source devices 289 and the network member devices 299. The network(s) 210 may include, for example, one or more wireless or wired local area or wide area networks, including the Internet. The network(s) 210 provide a transport mechanism or interconnection of multiple transport mechanisms for data exchange between the collaboration system 200, the message source devices 289, and the network member devices 299, directly, or through intermediaries, such as other processing systems. The message source devices 289 and the network member devices 299 may be communications devices connected to the network 210, including laptops, email clients, cellular phones, personal computers (PCs), personal digital assistants (PDAs, e.g., a iPhone™, Blackberry™ or Smartphone™ device) or other electronic devices capable of communicating to the network 210.

The system 200 receives and stores in the memory 204 a source collaboration message 212 obtained from a message source via a particular message source device (e.g., the message source 289s). The memory also includes an aggregated collaboration response 214 which will be returned to the message source after the system 200 has generated it based upon inputs received from the network members via network member devices 299. The memory 204 also includes collaboration constraint definitions 216 that establish or define one or more collaboration constraints on social network input, such as the "maximum number of characters" collaboration constraint 218 through the 'n'th collaboration constraint 220. In the example shown in FIG. 2, the first collaboration constraint 218 specifies a maximum number of characters allowed in a response from a social network member. Table 1 explains additional examples of collaboration constraints, but the system 200 may define and apply additional, fewer, or different collaboration constraints.

TABLE 1

Collaboration Constraints

| Name | Description |
| --- | --- |
| Minimum Characters | The minimum number of characters that a network member must provide before aggregating the input into the aggregated collaboration response. |
| Maximum Characters | The maximum number of characters that a network member may provide for aggregating the input into the aggregated collaboration response. |
| Restricted Words | List of restricted word that may not appear in the text input in order to aggregate into the aggregated collaboration response. |
| Maximum Idle Time | The maximum duration of time a network member may take without providing any input. |

The memory 204 further includes completion constraint definitions 222 that establish or define one or more completion constraints on social network input, such as the time completion constraint 224, the number of inputs completion constraint 226, through the 'n'th completion constraint 228. The time completion constraint 224 may specify, for example, a period of time required to run before returning the aggregated collaboration response 214. Table 2 explains examples of completion constraints, but the system 200 may define and apply additional, fewer, or different completion constraints.

TABLE 2

Completion Constraints

| Name | Description |
| --- | --- |
| Minimum Inputs | The minimum number of inputs that must be provided before returning the aggregated collaboration response. |
| Maximum Inputs | The maximum number of inputs that may be provided for returning the aggregated collaboration response. |

TABLE 2-continued

Completion Constraints

| Name | Description |
|---|---|
| Time | The period of time at the end of which the aggregated collaboration response is returned. |
| Minimum Validation | The minimum number of validation responses that must be received before returning the aggregated collaboration response. |
| Minimum View | The minimum number of network members that must view the source collaboration message before returning the aggregated collaboration response. |
| Maximum View | The maximum number of network members that may view the source collaboration message before returning the aggregated collaboration response. |

The system 200 may operate on a source message input field 230 and a collaboration input field 232 stored or manipulated in the memory 204. The source message input field 230 may provide the local data store for a source message input field displayed on a message source device 289s and may receive the source collaboration message 212 from the message source. The collaboration input field 232 may provide the local data store for inputs received from network member devices 299 and obtained through input fields displayed on the network member devices 299.

A first social network definition 232 is also stored in the memory 204. The first social network definition 232 contains a first social network identifier (ID) 234 and one or more network member identifiers (ID) 236. As described above, the system 200 may interact with additional social networks, such as the network represented by the second social network definition 240. The additional social network definitions may be social networks established, defined, or specified by any network member of a different social network. FIG. 2 shows an example in which the network member 236 of the first social network has specified that he or she is connected to a second social network, as defined by the second social network definition 240. The second social network definition 240 includes a second social network ID 242, and one or more network member identifiers (ID) 244.

The memory 204 also includes a collaboration program 250. The collaboration program 250 implements logic, (e.g., using as processor executable instructions), that when executed by the processor 202, causes the processor to carry out the social network collaboration processing.

Figure 3:
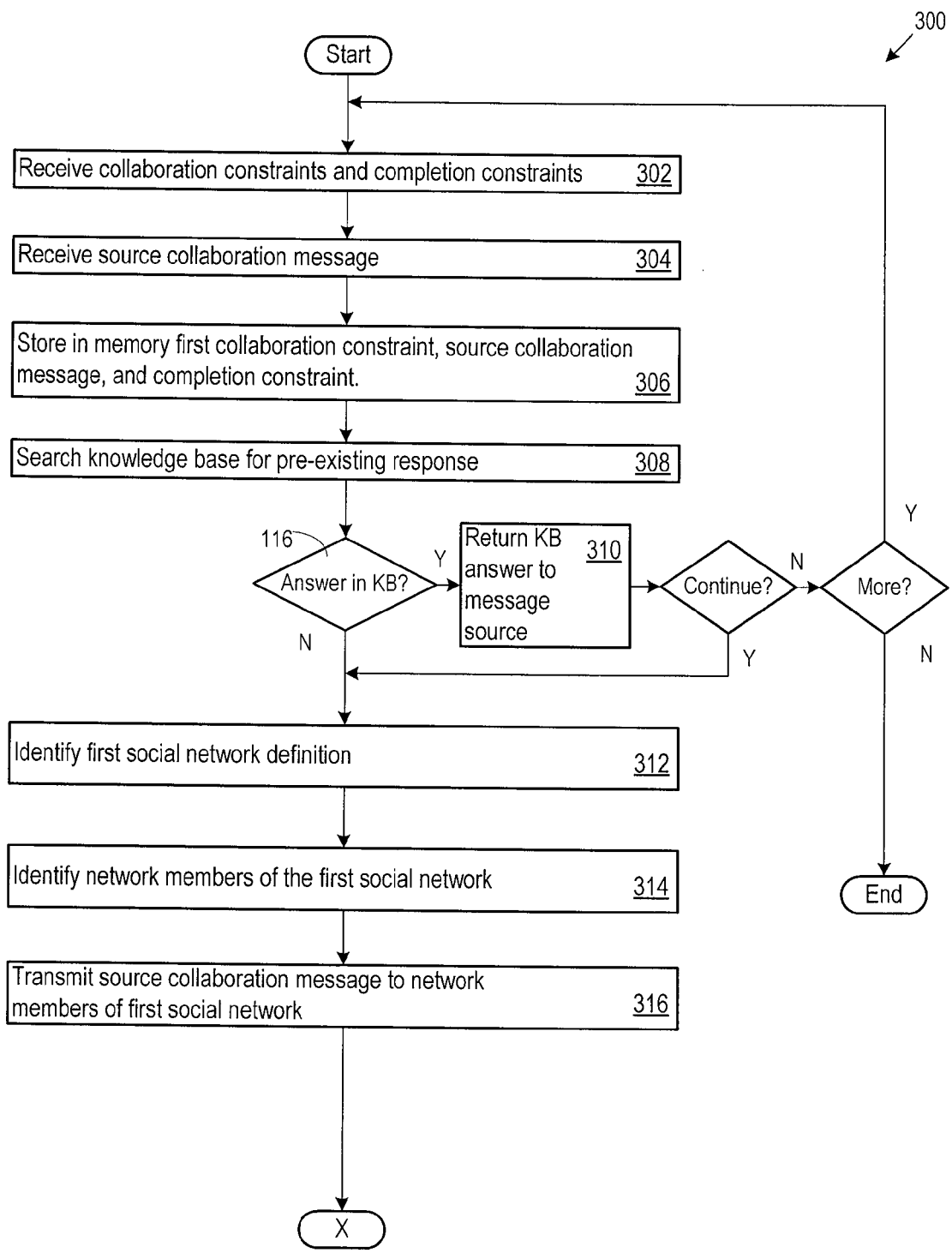
FIG. 3 shows a first part of a flow diagram of the logic that a collaboration program in a collaboration system may implement.

FIG. 3 shows a first part of a flow diagram 300 of the logic that the collaboration program 250 in the system 200 may implement. The collaboration program 250 first reads, accepts, receives, or otherwise determines one or more collaboration constraint definitions 216 and completion constraint definitions 222. The collaboration constraint definitions 216 and the completion constraint definitions 222 may be received from the message source, may be predefined in the memory 204 (302), may be hardcoded into the logic of the collaboration program 250, or may be determined in other manners. Next, the logic receives a source collaboration message 212 from the message source (304). The source collaboration message 212 may be, for example, in the form of a question, a statement, music, a photograph, or any other form for a source message on which input is sought. The received collaboration constraint definitions 216, completion constraint definitions 222, and the source collaboration message 212 are stored in the memory 204 (306).

Figure 5:
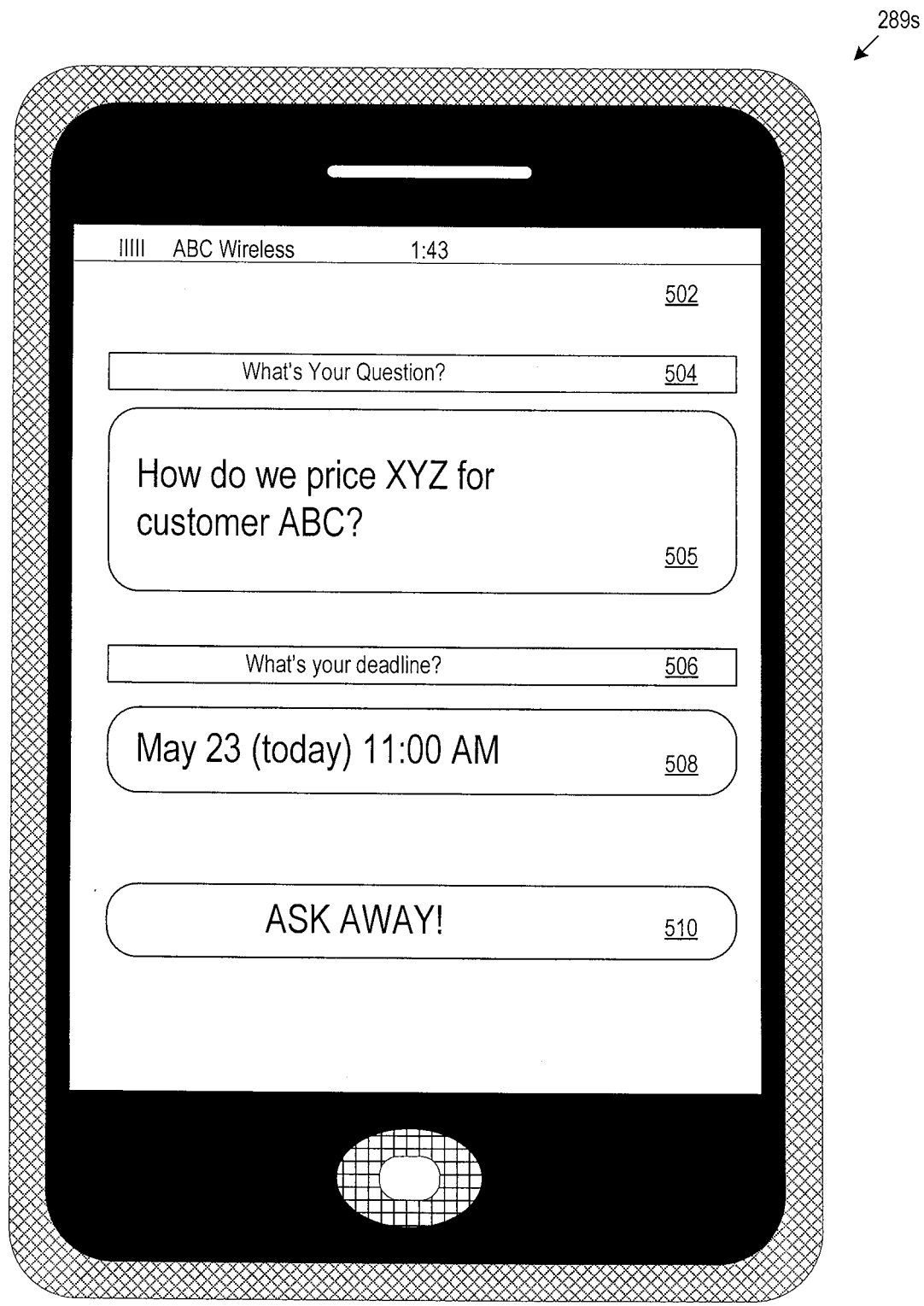
FIG. 5 shows an example of a source message input interface.

Turning briefly to FIG. 5, that figure shows an example of a source message input interface 502 displayed on the message source device 289s. The source message input interface 502 provides the interface through which the program 250 may receive the source collaboration message 212, the collaboration constraints 216, the completion constraints 222, or other information from the message source device 289s. In the example shown in FIG. 5, the source message input interface 502 displays a prompt 504 for a source collaboration message, a source message input field 505 and an "ask" button 510 which triggers the message source device 289s to communicate the source collaboration information to the program 250.

The message source device 289s may further display a completion constraint prompt 506 for a completion constraint, a completion constraint input field 508 through which the message source device 289s may receive a completion constraint. In the example shown in FIG. 5, the completion constraint specifies that an answer must be returned no later than May 23 at 11 am. The message source device 289s may also display a collaboration constraint prompt and collaboration constraint input field through which the collaboration program 250 may receive a collaboration constraint. Furthermore, the message source device 289s may provide input fields through which the message source device 289s specifies social network definitions for the program 250, such as the first and second social network definitions 232 and 240.

Referring back to FIG. 3, the program 250 subsequently searches through the knowledge base 120 for relevant information stored in the knowledge base that may be responsive to the source collaboration message 212 (308). The knowledge base 120 may be a computer database or any other information repository in which information may be indexed and stored. If a suitable response is found in the knowledge base 120, the response is returned to the message source (310) (e.g., the message source device 289s). The criteria that define whether any one or more search results are deemed suitable may be hardcoded in the program 250, obtained as inputs from the message source, or may be established in other ways.

The program 250 may continue with community collaboration even after a suitable response is found. As examples, the program 250 may be preconfigured to always continue with submission of the source collaboration message to the social network, or the program 250 may query the message source device 289s whether or not to proceed with submission to the social network. If the program 250 will not submit the source collaboration message, the program may prompt the message source for additional source collaboration messages. If a negative reply is received, the program 250 will finish. If a positive reply is received, the program 250 may return to (302). The prompt for the reply may be made on the source message input interface 502 and the reply may be made by typing in the source message input field, clicking on a prompt, or in another manner.

If the program 250 does not find a suitable item of information in the knowledge base 120 or the program will otherwise submit the source collaboration message, then the program identifies the first social network definition 232 using the first social network ID 234 (312). Once the first social network definition 232 is identified, the program 250 identifies the network members 236 of the first social network, to which the source collaboration message 212 is to be submitted (314). The program 250 then transmits the source collaboration message to the network members 236 (316).

As discussed above, the program 250 may receive the social network definition from the message source or the social network definitions may be predefined in the memory 204. In addition, the program 250 may allow the message source to utilize social network grouping methods such as the methods available on Facebook™ Filters or Groups to indicate a subset of the entire available social network to which the source collaboration message 212 may be transmitted. In one embodiment, the program 250 may submit the source collaboration message 212 to the entire available social network by default, unless otherwise specified by the message source. In other words, the message source may specify to the program 250 to communicate the source collaboration message to selected individuals within the social network definition, rather than the entire social network.

The program 250 may further receive from the message source a privilege definition 254 defining the scope of social network to which the program may transmit the source collaboration message 212. The privilege definition 254 may also be predefined in the memory 204 by an organization to which the message source belongs. The organization may define the privilege definition 254 based on the identity of the message source, taking into account, for example, message source's title, length of time with the organization, and prior experience with the message source. For example, a chief executive officer (CEO) of an organization may be associated with a privilege definition 254 which allows the CEO to transmit a source collaboration message 212 to the entire organization, while a chief legal counsel may be associated with a privilege definition which allows the counsel to transmit a source collaboration message only to the legal department.

The program 250 may transmit the source collaboration message 212 to the network member 236 by transmitting the source collaboration message to a network member device 299 for that particular network member. In one embodiment, the program 250 may transmit the source collaboration message 212 to the network members 236 in a sequential manner, based on a predefined transmission algorithm. Factors that the transmission algorithm may use to determine the order in which the source collaboration message 212 is delivered may include, but are not limited to:

a. past likeliness to answer inquiries generally,
 b. past likeliness to answer the particular message source,
 c. probability that the network member has knowledge on the subject at hand,
 d. presence; and
 e. an explicit sequence as specified by the message source The program 250 may determine factors a. and b. by consulting the knowledge base 120, which may store information regarding the network members 236 or 244 who have previously responded to source collaboration messages 212. The program 250 may determine the factor c. by searching an expert database which may be coupled to the system 200, which stores information relating to the network members' expertise. The program 250 may determine factor d. by reading a presence indicator which indicates whether or not network members are currently available. The indicator may be, for example, the on-/off-line indicator implemented in presence systems such as Microsoft™ Office Communicator™. In one implementation, sequentially transmitting the message source 212, the logic that program 250 may implement may include transmitting the source collaboration message 212 to a network member, waiting until the network member has provided an input or until a predetermined condition is met, and transmitting the source collaboration message to the next network member.

In other embodiments, the program 250 may transmit the source collaboration message 212 in parallel (i.e., transmit the source collaboration message to multiple network members 236 at the same time). The program 250 may also receive inputs from the network members in a collaborative authoring manner, which may be near-real-time.

The program 250 may also lock the collaboration input field 232 so that only one network member may provide input at a time. In other words, once a network member begins the input process, the program 250 may prevent the collaboration input field 232 from receiving input from other network members. The program 250 may unlock the message and another network member may provide input after the previous network member has concluded the input process.

Figure 4:
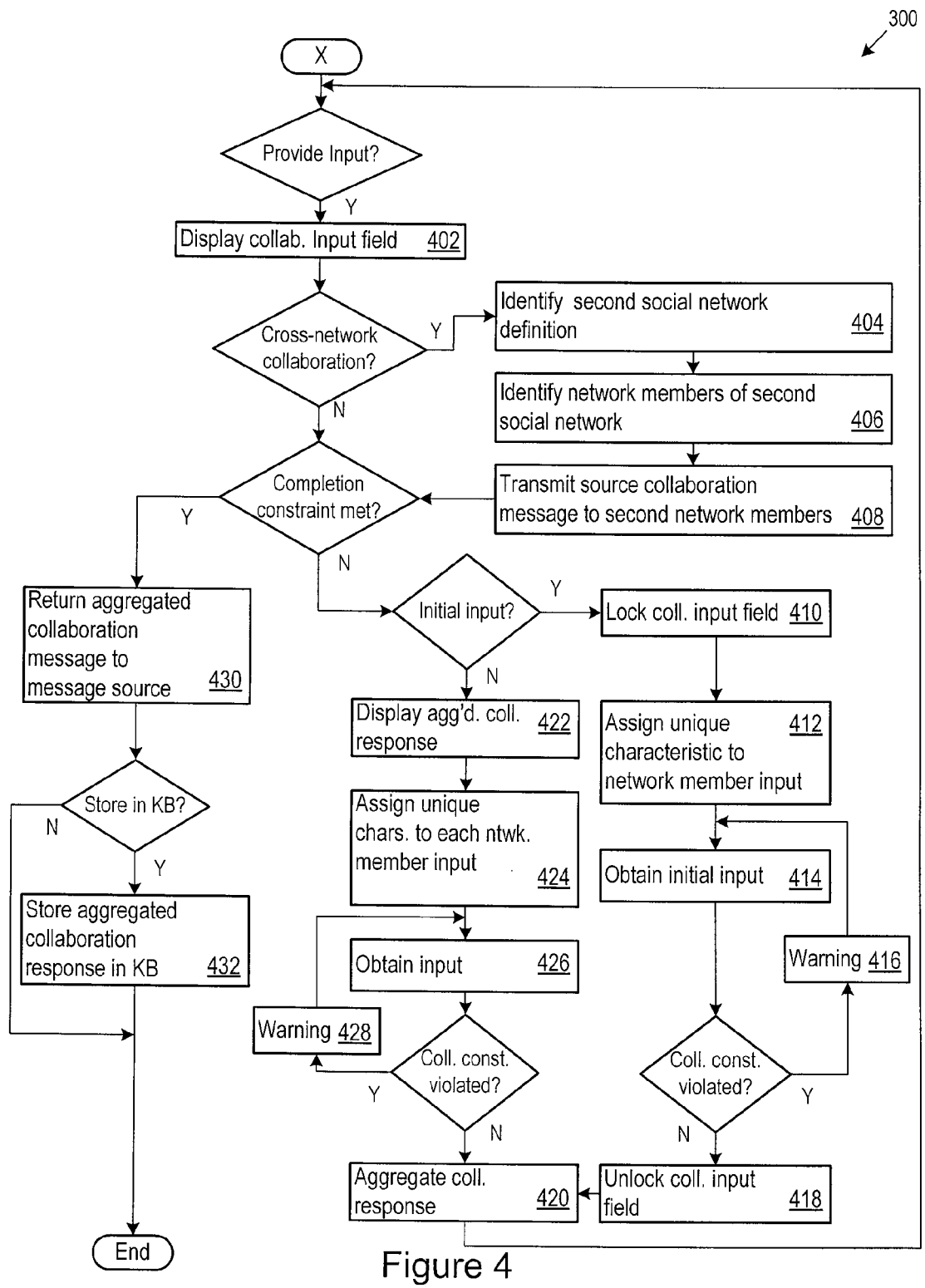
FIG. 4 shows a second part of the flow diagram of the logic that the collaboration program may implement.

FIG. 4 shows a second part of the flow diagram 300 of the logic that the collaboration program 250 may implement. After the program 250 transmits the source collaboration message 212 to a network member device 299, the network member device may display the source collaboration message to the network member 236.

Figure 6:
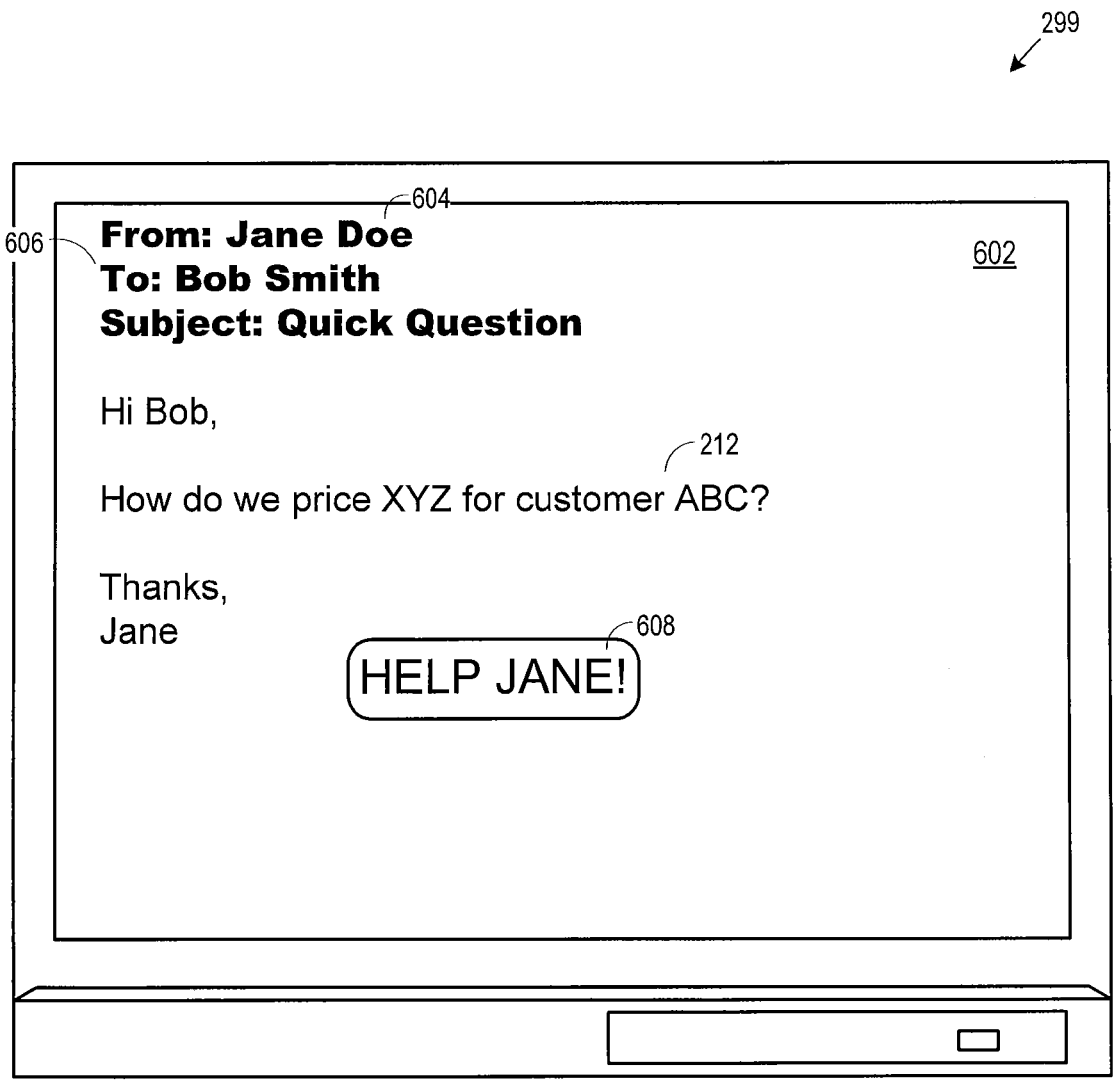
FIG. 6 shows an example of a source collaboration message displayed on a network member device.

As shown in the example in FIG. 6, the network member device 299 may display a network member device interface 602, including the source collaboration message 212, a message source identifier 604 identifying the message source, and a network member identifier 606, identifying the network member 236. The network member device 299 may receive an indication to provide input in response to the source collaboration message 212 from the network member 236 by providing, for example, a button 608 on which the network member may click. In case the program 250 transmits the source collaboration message to the network members sequentially, in the absence of network member's indication to provide input in response to the source collaboration message, the program 250 may wait until a predefined period of time elapses, and allow another network member to provide input. When the network member 236 provides an indication to provide input, the network member device 299 may display the collaboration input field 232 (402). In case where the program 250 transmits the source collaboration message to the network members in parallel, the network member device 299 may not display the collaboration input field 232 and the program may prevent the network member from providing the input if another network member is currently providing input to the source collaboration message 212 (the collaboration input field 232 is "locked").

Figure 7:
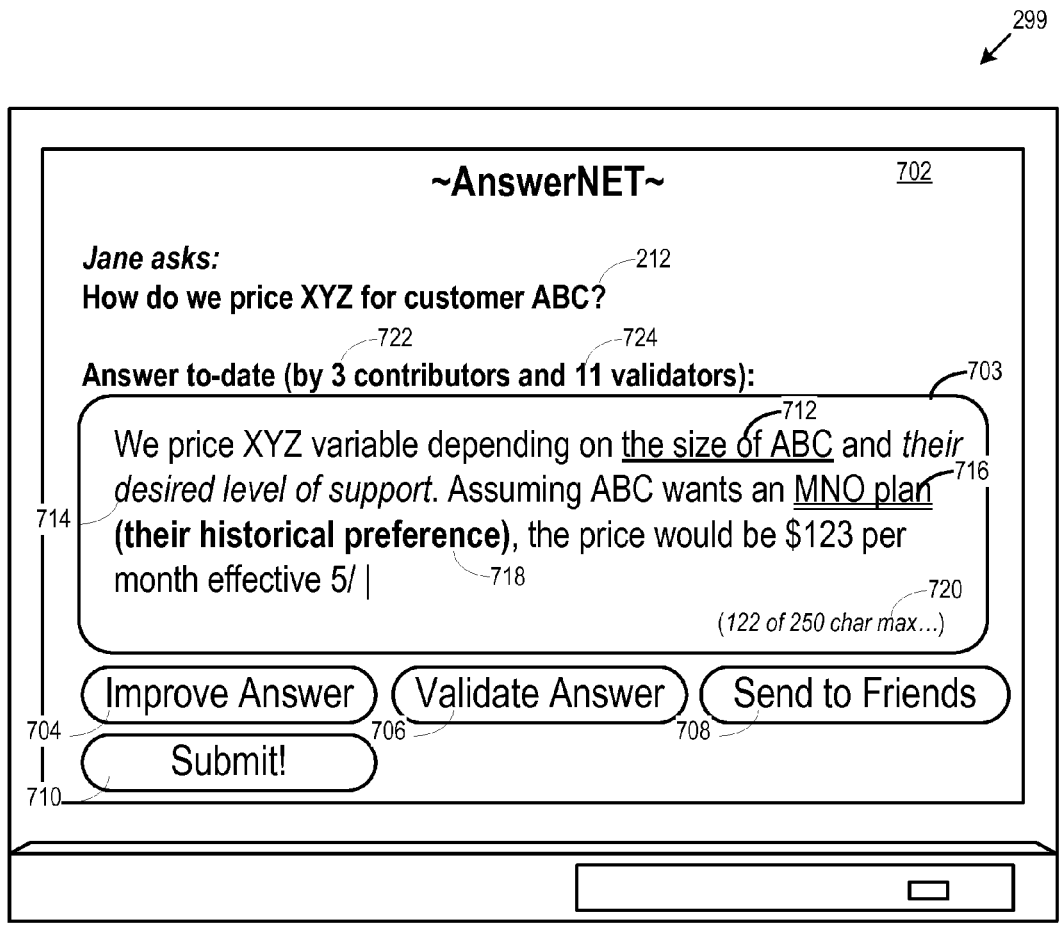
FIG. 7 shows an example of a collaboration input field displayed on a network member device.

FIG. 7 shows an example of a network member device 299 displaying an input interface 702. The input interface 702 displays the source collaboration message 212, collaboration input field interface 703, "improve answer" button 704, "validate answer" button 706, "send to friends" button 708, and the submit button 710. The collaboration input field interface 703 displays the contents of the collaboration input field 232. In addition, the program 250 may receive input from the network members via the collaboration input field interface 703 and store the input in the collaboration input field 232. The collaboration input field 232 and thus the collaboration input field interface 703 may be blank for an initial network member 236 providing input in response to the source collaboration message 212. As an input in response to the source collaboration message 212, the initial network member may provide a text input into the collaboration input field, with the program 250 enforcing the collaboration constraints 216 discussed above. If the network member providing input is not an initial network member, a previous aggregated collaboration response 214 having the aggregated inputs from other network members are stored onto the collaboration input field 232 and displayed on the collaboration input field interface 703. The program 250 may assign unique characteristics to text inputs from each network member using underlines 712, italics 714, double underline 716, and bold face 718 characters. Other unique characteristics including, but not limited to, color, sound, or haptic feedback may also be used.

If a network member desires to provide a text input, the network member may click on the "improve answer" button 704, and the program 250 may receive input on the collaboration input field interface 703. The program 250 may also receive an indication of validation as an input from the network members 236. A network member may provide an indication of validation as a means to indicate approval of the current aggregated collaboration response 214. The network members 236 may "validate" the text inputs from previous network members (current aggregated collaboration response 214 which may be displayed on the collaboration input field interface 703) by, for example, clicking on the "validate answer" button 706. The input interface 702 may further display the number of network members who have provided text input (722) and the number of network members who have validated the text inputs (724). After the program 250 receives input (text input or indication of validation) from the network member, the program may aggregate the input into the aggregated collaboration response 214 when the network member indicates a desire to submit by, for example, clicking on the submit button 710. The input interface 702 may also display the collaboration constraint indicator 720 which reminds the network member of the collaboration constraint 216 that is in effect.

Referring back to FIG. 4, once the network member device 299 displays the input interface 702, the program 250 may receive an indication from the network member to transmit the source collaboration message 212 to a second social network. The program 250 may receive such indication, for example, when the network member 236 clicks on the "send to friends" button 708. After receiving the indication to transmit the source collaboration message 212 to the second social network, the program 250 identifies the second social network definition 240 based on the second social network ID 242 (404). Once the second social network definition 232 is identified, the program 250 identifies the network members 244 of the second social network, to which the source collaboration message 212 is to be submitted (406). The program 250 then transmits the source collaboration message 212 to the second network members 244 (408). A network member device 299 may display the source collaboration message 212 transmitted to the network members 244.

The program 250 determines whether or not the completion constraint 216 is met. If the completion constraint 216 is not met, in one embodiment the program 250 further determines whether or not the network member providing the input is an initial network member providing the input. If the network member providing the input is an initial network member (e.g., no network member has provided an input in response to the source collaboration message 212 before), the program 250 locks the collaboration input field 232 so that only the initial network member may provide input to the collaboration input field 232 (410). The program 250, as discussed above, may also assign a unique characteristic to each text input of the network member 236 or 244 made onto the collaboration input field 232 (412). The program 250 may then obtain an initial text input on the collaboration input field 232 (414), subject to the completion constraint 222. If the collaboration constraint 222 is violated, the program 250 causes the network member device 299 to display a warning to the initial network member, prompting the initial network member to provide an input conforming to the completion constraint (416). When an input conforming to the completion constraint 222 and an indication of desire to submit the input is received, the program 250 unlocks the collaboration input field 232 so that other network members may provide further input responsive to the source collaboration message 212 (418), and the input is aggregated into the aggregated collaboration response 214 (420). In an embodiment of the system, each time new input is aggregated into the aggregated collaboration response 214, the program 250 may also store the aggregated collaboration response in an aggregated collaboration response ("ACR") history repository 256. The ACR history repository may be retained in the memory 204, the knowledge base 120, or other database, along with the network member ID of the network member who provided the latest input, a timestamp for the latest input, or other identifying data. Each time a new input is aggregated into the aggregated collaboration response 214, a new entry may be created and stored in the ACR history repository 256. Thus, the ACR history repository 256 may store a "snapshot" of each of the aggregated collaboration responses as it exists after each input by a network member is aggregated into the aggregated collaboration response 214. A "snapshot" may refer to the contents of the aggregated collaboration response at a certain point of time, or after a certain number of inputs have been received.

If the network member providing input in response to the source collaboration message 212 is not an initial network member (e.g. a network member has provided an input in response to the source collaboration message 212 before), the program 250 stores the aggregated collaboration response 214 onto the collaboration input field 232 and the network member device 299 displays its contents on the collaboration input field interface 703 (422). The program 250 further assigns a unique characteristic to each text input of the network members 236 or 244 (424). An input may be obtained from the network member (426), subject to the completion constraint 222 that are active or selected by the message source. If the collaboration constraint 222 is violated, the network member device 299 displays a warning to the network member, prompting the network member to provide an input conforming to the completion constraint (428). As with the initial network member, the input may be a text input made onto the collaboration input field 232 via the collaboration input field interface 703. However, in the case of a non-initial network member, as discussed above, the network member may also provide an indication of validation of the text input provided by previous network members (the text inputs are represented by the aggregated collaboration response 214 displayed on the collaboration input field interface 703). The number of network members who have validated the aggregated collaboration response 214 may be stored in a validation count 252, which may be stored in the memory 204. In other embodiments the validation count 252 may be stored in the aggregated collaboration response 214. When the program 250 receives an input conforming to the completion constraint 222 and an indication of desire to submit, the program aggregates the input into the aggregated collaboration response 214 (420). In one embodiment the validation count 252 is reset each time a new text input is aggregated into the aggregated collaboration response 214. A record of each aggregated collaboration response with the corresponding validation count may be stored in the memory 204.

Other embodiments are also possible, where the program 250 may lock/unlock the collaboration input field 232 also for the non-initial network members, or the program may not lock the collaboration input field for both the initial and non-initial network members. In addition, a "text input" may also include any non-validation type of input which adds, deletes or modifies the information already present in the aggregated collaboration response 214. In other implementations, the inputs gathered from the network members may include audio (e.g., spoken commentary), video, or other types of input.

After program 250 aggregates the inputs into the aggregated collaboration response 214, the program 250 may again determine whether or not a network member has selected to transmit the source collaboration message 212 to another social network and whether or not the completion constraint 222 is met. The program 250 may return the aggregated collaboration response 214 to the message source if the completion constraint 222 is met (430). At the same time, or after the aggregated collaboration response 214 is returned to the message source, program 250 may store the aggregated collaboration response in the knowledge base 120 as discussed above (432). The ACR history repository 256 may also be returned to the message source.

Figure 8:
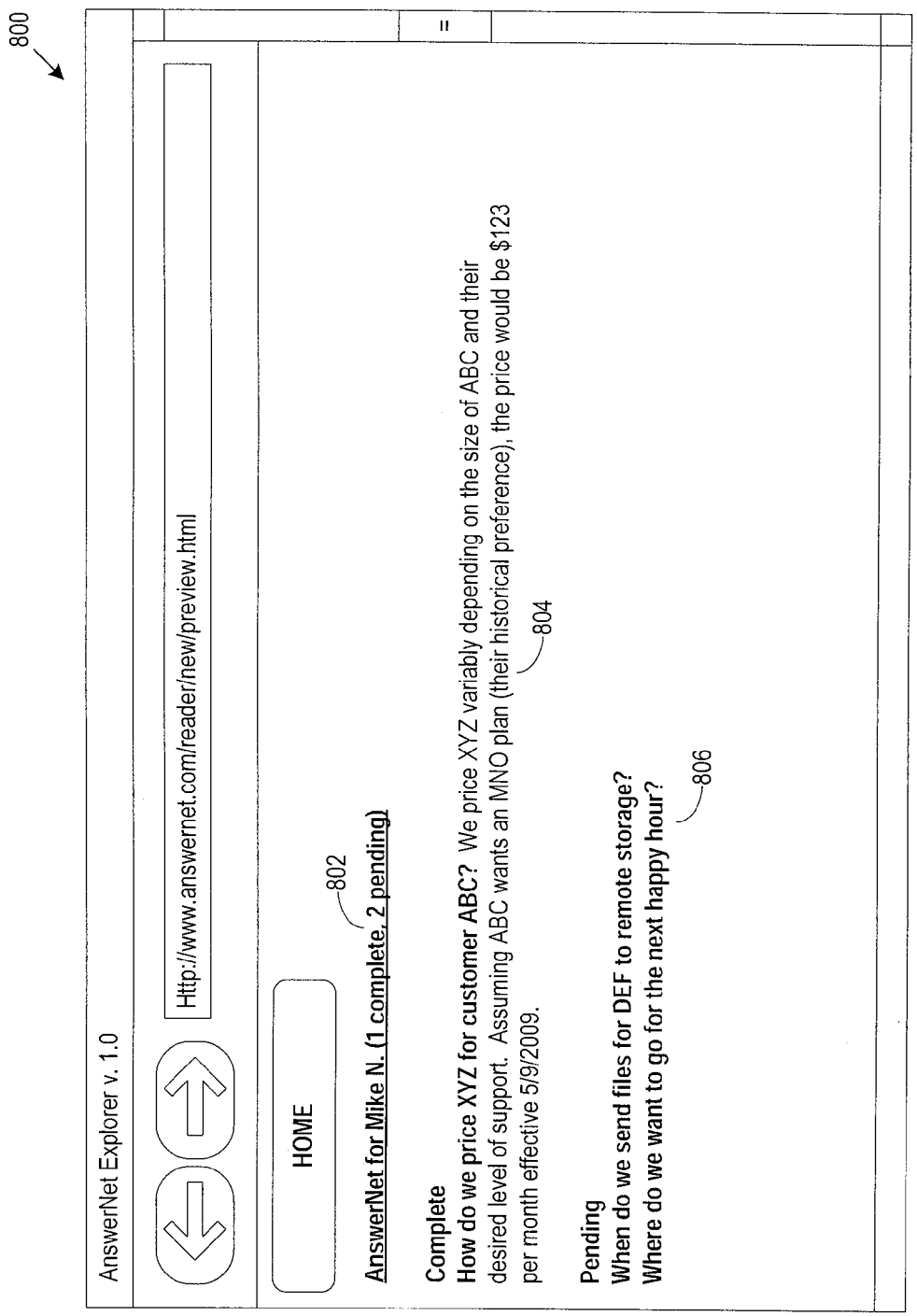
FIG. 8 shows an example of a message source user interface.

The program 250 may determine whether or not to store the aggregated collaboration response 214 in the knowledge base 120. Examples of how the program 250 may determine whether to store the aggregated collaboration response include, but are not limited to the following:

Asker's Privilege: In this case, the program 250 may receive an indication from the message source whether or not the aggregated collaboration response is to be stored in the knowledge base 120. This indication may be received in response to a prompt and input interface displayed on the source message input interface 502 at the time source collaboration message is received, or received on a prompt and input interface displayed on a message source interface 800 (as shown in FIG. 8, which will be explained in further detail below) after the aggregated collaboration response 214 is returned to the message source.

Community Privilege: In this case, the program 250 may store the aggregated collaboration response 214 in the knowledge base 120 whenever the validation count 252 is greater than a validation threshold. Validation threshold may be a predefined number which may be stored in the memory 204.

Hybrid Privilege (AND Boolean): In this case, the program 250 may store the aggregated collaboration response 214 in the knowledge base 120 if the validation count 252 is greater than the validation threshold and the program receives an indication from the message source to store the collaboration response in the knowledge base (Asker's Privilege AND Community Privilege is satisfied).

Hybrid Privilege (OR Boolean): In this case, the program 250 may store the aggregated collaboration response 214 in the knowledge base 120 either when the validation count 252 is greater than the validation threshold, or the program receives an indication from the message source to store the collaboration response in the knowledge base (Asker's Privilege OR Community Privilege is satisfied).

After returning the aggregated collaboration response the program 250 may allow the message source to revise the source collaboration message and/or revise the completion constraint and re-transmit the source collaboration message to the network members for a responsive input. In addition, the program 250 may also allow the message source to review the snapshots of the aggregated collaboration response stored in the ACR history repository 256. The message source may browse through each of the snapshots, for example, by using a scroll wheel of a computer mouse or by using forward and backward arrows of a keyboard or of a snapshot browsing user interface.

FIG. 8 shows an example of message source user interface 800. The message source device 289s or other computer devices coupled to the network 210 may display the message source user interface 800. The message source user interface 800 may display a summary 802 of the status of various source collaboration messages for a message source. The message source user interface 800 may further display a status of completed messages 804 (source collaboration messages to which the program 250 has returned the aggregated collaboration response 214, or the completion constraint 222 is met). The status of completed messages 804 may include the source collaboration message that was transmitted to the network members, along with the aggregated collaboration response that was returned by the program 250. The status of completed messages 804 may also include the validation count 252 and the number of network members who have provided input to the returned aggregated collaboration response. The message source user interface 800 may also display the status of pending messages 806 (source collaboration messages to which the program 250 has not returned an aggregated collaboration response 214, or the completion constraint 222 is not yet met). The status of pending messages 806 may display the source collaboration messages which are still pending. The summary 802, the status of completed messages 804, and the status of pending messages 806 may be stored in a source database 208, which is coupled to the processor 202, the memory 204, and the network communications interface 206.

The knowledge base 120 may be implemented using one or more of 1. a core relational database management system (RDBMS), 2. a content or knowledge management system such as Documentum™, Filenet™, SharePoint™, and 3. wiki platforms. In the case of RDBMS implementation, the knowledge base may contain source collaboration message/aggregated collaboration response pairs with associate metadata, such as validation counts, message source identifier and dates. The RDBMS may be accessed directly via database software languages such as SQL or by graphical user interfaces. The content or knowledge management systems may provide a data model, search capability and user interface. The wiki platform may provide a method of storing multiple versions of data in both the knowledge base 120 and in memory 204, along with editing and locking capabilities.

The social network definition may be provided and maintained using software such as Microsoft™ Town Square™, NewsGator™ Groups™, LinkedIn™ Facebook™ and mySpace™. The network communications interface 206 may be implemented using hardware and software for implementing instant messenger service, email, web applications, desktop applications, Windows™ Mobile App™, BlackBerry™ App, iPhone™ App, and RSS.

The collaboration program 250 described above may be implemented in any combination of hardware and software. For example, programs provided in software libraries may provide the functionality that receives the social network ID, identifies the social network corresponding to the social network ID, identifies the network members of the social network, and transmits the source collaboration messages to the network members. Such software libraries may include dynamic link libraries (DLLs), or other application programming interfaces (APIs). The logic described above may be stored on a computer readable medium, such as a CDROM, hard drive, floppy disk, flash memory, or other computer readable medium. The logic may also be encoded in a signal that bears the logic as the signal propagates from a source to a destination.

In addition, the system 200 may be implemented as a particular machine. For example, the particular machine may include a CPU, GPU, and software library for carrying out the logic implemented in the collaboration program noted above. Thus, the particular machine may include a CPU, a GPU, and a memory that stores the collaboration program described above. Adding the collaboration program may include building function calls into applications from a software library that handle the receiving, storing, transmitting, determining, enforcing, and aggregating logic noted above or providing an API call wrapper and program logic to handle the processing noted above. However, the applications or execution environment of the applications may be extended in other ways to cause the interaction with collaboration program.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A method for social network collaboration, comprising:
    storing in a memory a first collaboration constraint upon social network input;
    storing in the memory a source collaboration message obtained from a message source;
    defining in the memory a first social network definition comprising first network members specified by the message source;
    executing with a processor a collaboration program stored in the memory, the collaboration program comprising logic that when executed causes the processor to:
        transmit the source collaboration message to the first network members;
        obtain from the first network members a first collaboration input on the source collaboration message;
        constrain the first collaboration input by the first collaboration constraint to obtain a first constrained collaboration input;
        obtain from the first network members a second collaboration input on the source collaboration message;
        constrain the second collaboration input to obtain a second constrained collaboration input;
        generate an aggregated collaboration response by modifying the first constrained collaboration input with the second constrained collaboration input, the aggregated collaboration response thereby reflecting how the second constrained collaboration input changes the first constrained collaboration input;
        determine a count of how many validation indicators for the aggregated collaboration response have been received from the first network members;
        modify the aggregated collaboration response to include the count;
        return the aggregated collaboration response to the message source; and
        reset the count when a non-validating collaboration input to the aggregated collaboration response is among the collaboration inputs.

2. The method of claim 1, further comprising:
    storing in the memory a first completion constraint upon the social network input; and where:
    the collaboration program further comprises logic that when executed causes the processor to determine when the first completion constraint is met and responsively return the aggregated collaboration response to the message source.

3. The method of claim 2, wherein the first completion constraint comprises a temporal condition, a maximum number of characters in the aggregated collaboration response, or both.

4. The method of claim 2, wherein the first completion constraint specifies a number of the first network members who must provide a collaboration input among the collaboration inputs before returning the aggregated collaboration response to the message source.

5. The method of claim 1, wherein a collaboration input among the collaboration inputs comprises a text entry responsive to the source collaboration message constrained by the first collaboration constraint.

6. The method of claim 1, where the collaboration program further comprises logic that when executed causes the processor to assign a unique characteristic to each of the collaboration inputs to distinguish at least two of the first network members.

7. The method of claim 1, wherein the collaboration program further comprises logic that when executed causes the processor to:
    provide a collaboration input field; and
    lock the collaboration input field such that only a selected one of the first network members may provide an initial collaboration input among each of the collaboration inputs through the collaboration input field.

8. The method of claim 1, further comprising:
    defining in the memory a second social network definition comprising second network members specified by at least one of the first network members; and
    where the collaboration program further comprises logic that when executed causes the processor to:
        transmit the source collaboration message to each of the second network members;
        obtain from the second network members additional collaboration inputs constrained by the first collaboration constraint; and
        aggregate the additional collaboration inputs into the aggregated collaboration response, thereby further modifying the aggregated collaboration response.

9. The method of claim 1, where the collaboration program further comprises logic that when executed causes the processor to:
    modify the aggregated collaboration response to include a contributor count that specifies a total number of network members providing collaboration inputs that modify the aggregated collaboration response.

10. An article of manufacture, comprising:
    a computer readable memory; and
    stored on the computer readable memory:
        a first collaboration constraint upon social network input;
        a collaboration program comprising logic that when executed causes a processor to:
            transmit a source collaboration message obtained from a message source to first network members specified in a first social network definition;
            obtain from the first network members collaboration inputs on the source collaboration message, the collaboration inputs comprising a first collaboration input and a second collaboration input;
            constrain the first collaboration input by the first collaboration constraint to obtain a first constrained collaboration input;
            constrain the second collaboration input to obtain a second constrained collaboration input;
            aggregate the first constrained collaboration input with the second constrained collaboration input into an aggregated collaboration response that reflects how the second constrained collaboration input modifies the first constrained collaboration input;

return the aggregated collaboration response to the message source;

determine a count of how many validation indicators for the aggregated collaboration response have been received from the first network members;

modify the aggregated collaboration response to include the validation count; and reset the validation count when a non-validating collaboration input to the aggregated collaboration response is among the collaboration inputs.

11. The article of manufacture according to claim 10, where the memory further comprises:

a first completion constraint upon the social network input; and where:

the collaboration program further comprises logic that when executed causes the processor to determine when the first completion constraint is met and responsively return the aggregated collaboration response to the message source.

12. The article of manufacture according to claim 11, where the first completion constraint comprises a temporal condition, a maximum number of characters in the aggregated collaboration response, or both.

13. The article of manufacture according to claim 11, where the first completion constraint specifies a number of the first network members who must provide a collaboration input among the collaboration inputs before returning the aggregated collaboration response to the message source.

14. The article of manufacture according to claim 10, where a collaboration input among the collaboration inputs comprises a text entry responsive to the source collaboration message constrained by the first collaboration constraint.

15. The article of manufacture according to claim 10, where the collaboration program further comprises logic that when executed causes the processor to assign a unique characteristic to each of the collaboration inputs to distinguish at least two of the first network members.

16. The article of manufacture according to claim 10, where the collaboration program further comprises logic that when executed causes the processor to:

provide a collaboration input field; and lock the collaboration input field such that only a selected one of the first network members may provide an initial collaboration input among each of the collaboration inputs through the collaboration input field.

17. The article of manufacture according to claim 10, where:

the collaboration program further comprises logic that when executed causes the processor to:

transmit the source collaboration message to each of second network members specified in a second social network definition;

obtain from any number of the second network members additional collaboration inputs constrained by the first collaboration constraint; and aggregate the additional collaboration inputs into the aggregated collaboration response, thereby further modifying the aggregated collaboration response.

18. A system for social network collaboration, the system comprising:

a processor; and stored on a computer readable memory coupled to the processor:

a first collaboration constraint upon social network input;

a collaboration program comprising logic that when executed causes the processor to:

transmit a source collaboration message obtained from a message source to first network members specified in a first social network definition;

obtain from the first network members collaboration inputs on the source collaboration message, the collaboration inputs comprising a first collaboration input and a second collaboration input;

constrain first collaboration input by the first collaboration constraint to obtain a first constrained collaboration input;

constrain the second collaboration input to obtain a second constrained collaboration input;

aggregate the second constrained collaboration input into the first constrained collaboration input to generate an aggregated collaboration response that reflects how the second constrained collaboration input modifies the first constrained collaboration input;

save a snapshot of each aggregated collaboration response after any particular collaboration input is aggregated into the aggregated collaboration response, the snapshot capturing:

content of the aggregated collaboration response after modification by the particular collaboration input; and a network member identification of a network member providing a most recent collaboration input;

return the aggregated collaboration response to the message source;

determine a count of how many validation indicators for the aggregated collaboration response have been received from the first network members;

modify the aggregated collaboration response to include the count; and reset the count when a non-validating collaboration input to the aggregated collaboration response is among the collaboration inputs.

19. The system of claim 18, the computer readable memory further comprising:

a first completion constraint upon the social network input; and where:

the collaboration program further comprises logic that when executed causes the processor to determine when the first completion constraint is met and responsively return the aggregated collaboration response to the message source.

20. The system of claim 19, where the first completion constraint comprises a temporal condition, a maximum number of characters in the aggregated collaboration response, or both.

21. The system of claim 19, where the first completion constraint specifies a number of the first network members who must provide a collaboration input among the collaboration inputs before returning the aggregated collaboration response to the message source.

22. The system of claim 18, where a collaboration input among the collaboration inputs comprises a text entry responsive to the source collaboration message constrained by the first collaboration constraint.

23. The system of claim 18, where the collaboration program further comprises logic that when executed causes the processor to assign a unique characteristic to each of the collaboration inputs to distinguish at least two of the first network members.

24. The system of claim 18, where the collaboration program further comprises logic that when executed causes the processor to:
provide a collaboration input field; and
lock the collaboration input field such that only a selected one of the first network members may provide an initial collaboration input among each of the collaboration inputs through the collaboration input field.

25. The system of claim 18, where:
the collaboration program further comprises logic that when executed causes the processor to:
transmit the source collaboration message to each of second network members specified in a second social network definition;
obtain from any number of the second network members additional collaboration inputs constrained by the first collaboration constraint; and
aggregate the additional collaboration inputs into the aggregated collaboration response, thereby further modifying the aggregated collaboration response.

26. The system of claim 18, where the collaboration program further comprises logic that when executed causes the processor to:
modify the aggregated collaboration response to include a contributor count that specifies a total number of network members providing collaboration inputs that modify the aggregated collaboration response.

* * * * *